United States Patent
Chang et al.

(10) Patent No.: US 8,974,104 B2
(45) Date of Patent: Mar. 10, 2015

(54) BACKLIGHT MODULE

(75) Inventors: Yi-Wen Chang, Hsin-Chu (TW); Fu-Cheng Fan, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 339 days.

(21) Appl. No.: 13/449,880

(22) Filed: Apr. 18, 2012

(65) Prior Publication Data

US 2012/0300496 A1 Nov. 29, 2012

(30) Foreign Application Priority Data

May 26, 2011 (TW) .............................. 100118465 A

(51) Int. Cl.
| | | |
|---|---|---|
| F21V 7/05 | (2006.01) | |
| F21V 8/00 | (2006.01) | |
| F21V 7/00 | (2006.01) | |
| G02F 1/1335 | (2006.01) | |

(52) U.S. Cl.
CPC .............. G02B 6/002 (2013.01); G02B 6/0055 (2013.01); G02F 1/133615 (2013.01)
USPC ............................ 362/609; 362/610; 362/623

(58) Field of Classification Search
USPC ......... 362/600, 608–610, 615–620, 623–626; 349/65
See application file for complete search history.

(56) References Cited

U.S. PATENT DOCUMENTS

| | | | |
|---|---|---|---|
| 7,497,612 B2 * | 3/2009 | Okuda | 362/633 |
| 2005/0068473 A1 * | 3/2005 | Kim et al. | 349/65 |
| 2009/0033832 A1 | 2/2009 | Pai | |

FOREIGN PATENT DOCUMENTS

| | | |
|---|---|---|
| CN | 201210211 Y | 3/2009 |
| TW | 200835965 | 9/2008 |
| TW | 200835965 A | 9/2008 |
| TW | 200905311 | 2/2009 |
| TW | 201011412 | 3/2010 |

OTHER PUBLICATIONS

English translation of abstract of TW 200835965 A.
English translation of abstract and detailed description of CN 201210211 Y (published Mar. 18, 2009).
English translation of abstract and cited paragraph of TW 200835965 (published Sep. 1, 2008).
Taiwan Office Action dated May 6, 2014.
English translation of abstract of TW 201011412 (published Mar. 16, 2010).

* cited by examiner

*Primary Examiner* — Karabi Guharay
*Assistant Examiner* — Nathaniel Lee
(74) *Attorney, Agent, or Firm* — McClure, Qualey & Rodack, LLP

(57) ABSTRACT

A backlight module includes a light guide plate, at least one light source, and a light-reflecting plate. The light guide plate includes a light-emitting surface, a bottom surface, a light-incident surface, and a guiding tilt surface. One end of guiding tilt surface and light-emitting surface are intersected at a first boundary, and the other end connects to a top edge of light-incident surface. The guiding tilt surface extends toward a direction of protruding the light-emitting surface. The horizontal distance between the first boundary and light-incident surface is L. The light-reflecting plate is disposed under the bottom surface. When the horizontal distance d between light-incident surface and an end of light-reflecting plate near light-incident surface is less than L, the horizontal distance between a vertical projection of the end on light-emitting surface and first boundary is not more than 0.5 mm. When d is more than L, x is at least 0.5 mm.

24 Claims, 15 Drawing Sheets

BACKLIGHT MODULE

BACKGROUND OF THE INVENTION

1. Field of the Invention

The invention relates to a backlight module applied in a liquid crystal display (LCD), in particular, to a backlight module capable of improving the hotspot and bright line phenomenon and maintaining good light guiding efficiency.

2. Description of the Prior Art

In recent years, with the continuous progress of display technology, the design of the backlight module of the LCD is also continuously researched and developed. Please refer to FIG. 1. FIG. 1 illustrates a cross-sectional view of a backlight module of a conventional LCD in a prior art. As shown in FIG. 1, the backlight module 1 includes a wedge-shaped light guide plate 10, a light source 12, and a light reflecting plate 14. The main reason that the backlight module 1 using the wedge-shaped light guide plate 10 is to prevent the lights emitted by the upper half of the light source surface 120 of the light source 12 from being emitted out of the light guide plate 10, so that the lights can be smoothly emitted into the light guide plate 10 to enhance the efficiency of the light guide plate 10.

The backlight module 1 using the wedge-shaped light guide plate 10 has the above-mentioned advantages, however, as shown in FIG. 1, after the light R emitted by the light source surface 120 of the light source 12 passes through the light-incident surface 100 of the light guide plate 10 to enter into the light guide plate 10, the light R will be reflected out of the bottom surface 104 by the guiding tilt surface 102 of the light guide plate 10, and then emitted to the light reflecting plate 14 under the bottom surface 104. Then, the light reflecting plate 14 will reflect the light R into the wedge-shaped light guide plate 10, and the light R will be upward emitted out of the wedge-shaped light guide plate 10 from the light emitting surface 106 of the wedge-shaped light guide plate 10. As a result, the hot spot phenomenon and the light leakage phenomenon will occur at locations corresponding to the light source 12 of the conventional LCD, and the image quality displayed by the LCD will be seriously affected.

SUMMARY OF THE INVENTION

Therefore, a scope of the invention is to provide a backlight module applied in a LCD to solve the above-mentioned problems.

In a first embodiment, the backlight module includes a light guide plate, at least one light source, and a light-reflecting plate. The light guide plate includes a light emitting surface, a bottom surface, a light-incident surface, and a guiding tilt surface. The bottom surface is opposite to the light emitting surface. The light-incident surface is disposed at a side of the light emitting surface and the bottom surface and distributed along a direction across the light emitting surface and the bottom surface. One end of the guiding tilt surface and the light-emitting surface are intersected at a first boundary, and the other end of the guiding tilt surface connects with a top edge of the light-incident surface. The guiding tilt surface extends from the first boundary toward a direction of protruding the light-emitting surface, and a horizontal distance between the first boundary and the light-incident surface is a first length. The at least one light source is disposed corresponding to the light incident end, and the light source has a light source surface. A projection surface of the light source surface on the plane of the light-incident surface is covered by the light-incident surface. The light-reflecting plate is disposed under the bottom surface of the light guide plate. The light-reflecting plate has an end near the light-incident surface. When the horizontal distance between the end of the light-reflecting plate and the light-incident surface is smaller than the first length, the horizontal distance between a vertical projection of the end of the light-reflecting plate on the plane of the light emitting surface and the first boundary is a first offset; when the horizontal distance between the end of the light-reflecting plate and the light-incident surface is larger than the first length, the horizontal distance between the vertical projection of the end of the light-reflecting plate on the plane of the light emitting surface and the first boundary is a second offset. The first offset is not larger than 0.5 mm, and the second offset is at least 0.5 mm.

In this embodiment, the second offset is not larger than 1 mm.

In this embodiment, the first offset is smaller than or equal to the first length.

In this embodiment, the second offset is smaller than or equal to the first length.

In this embodiment, if the first length is longer, a first angle between the guiding tilt surface and the light emitting surface will be smaller.

In this embodiment, the light-incident surface has a second length on a vertical cross-section and the vertical distance between the bottom surface and the light emitting surface is a third length, the second length is larger than the third length.

In a second embodiment, the backlight module further includes an extended light-reflecting plate. The extended light-reflecting plate is disposed under the bottom surface of the light guide plate. One end of the extended light-reflecting plate connects with the end of the light-reflecting plate, and the other end of the extended light-reflecting plate aligns with the plane of the light-incident surface.

In this embodiment, the extended light-reflecting plate has at least one notch, and the number and the distribution of the at least one notch correspond to the at least one light source.

In this embodiment, the shape of the at least one notch is one selected from the group formed by a square, a rectangle, a trapezoid, a triangle, an arc, a polygon, and an irregular geometry.

In a third embodiment, the backlight module of the first embodiment further includes a light absorbing plate. The light absorbing plate is disposed under the bottom surface of the light guide plate. One end of the light absorbing plate connects with the end of the light-reflecting plate, and the other end of the light absorbing plate aligns with the plane of the light-incident surface.

In a fourth embodiment, the backlight module of the first embodiment further includes a bezel. The bezel is disposed under the light-reflecting plate. An end of the bezel near the light-incident surface aligns with the end of the light-reflecting plate.

In this embodiment, the backlight module further includes a light absorbing plate. One end of the light absorbing plate connects with the end of the bezel, and the other end of the light absorbing plate aligns with the plane of the light-incident surface.

In a fifth embodiment, a light absorbing layer is formed on the bottom surface of the light guide plate of the first embodiment. One end of the light absorbing layer aligns with the vertical projection of the end of the light-reflecting plate on the bottom surface, and the other end of the light absorbing layer aligns with the plane of the light-incident surface.

In a sixth embodiment, the light guide plate of the first embodiment further includes an optical coupling element. A side surface of the optical coupling element connects with the light-incident surface, another side surface of the optical coupling element is disposed corresponding to the light source and distributed along a direction across the light emitting surface and the bottom surface. A top surface of the optical coupling element is a flat surface and connects with the other end of the guiding tilt surface at the top edge of the light-incident surface.

In a seventh embodiment, the backlight module includes light guide plate, at least one light source, and a light-reflecting plate. The light guide plate includes a light emitting surface, a bottom surface, a light-incident surface, and a guiding tilt surface. The bottom surface is opposite to the light emitting surface. The light-incident surface is disposed at a side of the light emitting surface and the bottom surface and distributed along a direction across bottom surface. One end of the guiding tilt surface and the light emitting surface are intersected at a first boundary, the other end of the guiding tilt surface connects with the top edge of the light-incident surface. The guiding tilt surface extends from the first boundary toward a direction protruding the light emitting surface, and the horizontal distance between the first boundary and the light emitting surface is a first length. At least one light source is disposed corresponding to the light-incident surface. The light source has a light source surface, and the vertical projection of the light source surface on the plane of the light-incident surface is covered by the light-incident surface. The light-reflecting plate is disposed under the bottom surface of the light guide plate, and the light-reflecting plate has an end near the light-incident surface. The horizontal distance between the vertical projection of the end of the light-reflecting plate on the plane of the light emitting surface and the first boundary is smaller than or equal to the first length.

Compared to the prior art, the backlight module applied in the LCD of the invention has various kinds of design of light-reflecting plate structure and other elements. It can not only effectively improve the hot spot phenomenon and the light leakage phenomenon occurred in the conventional backlight module using wedge-shaped light guide plate, but also maintain good light guiding efficiency to obviously enhance the display effect of the LCD.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a backlight module. In this embodiment, the backlight module is an edge-type backlight module applied in a LCD, but not limited to this.

Figure 2A:
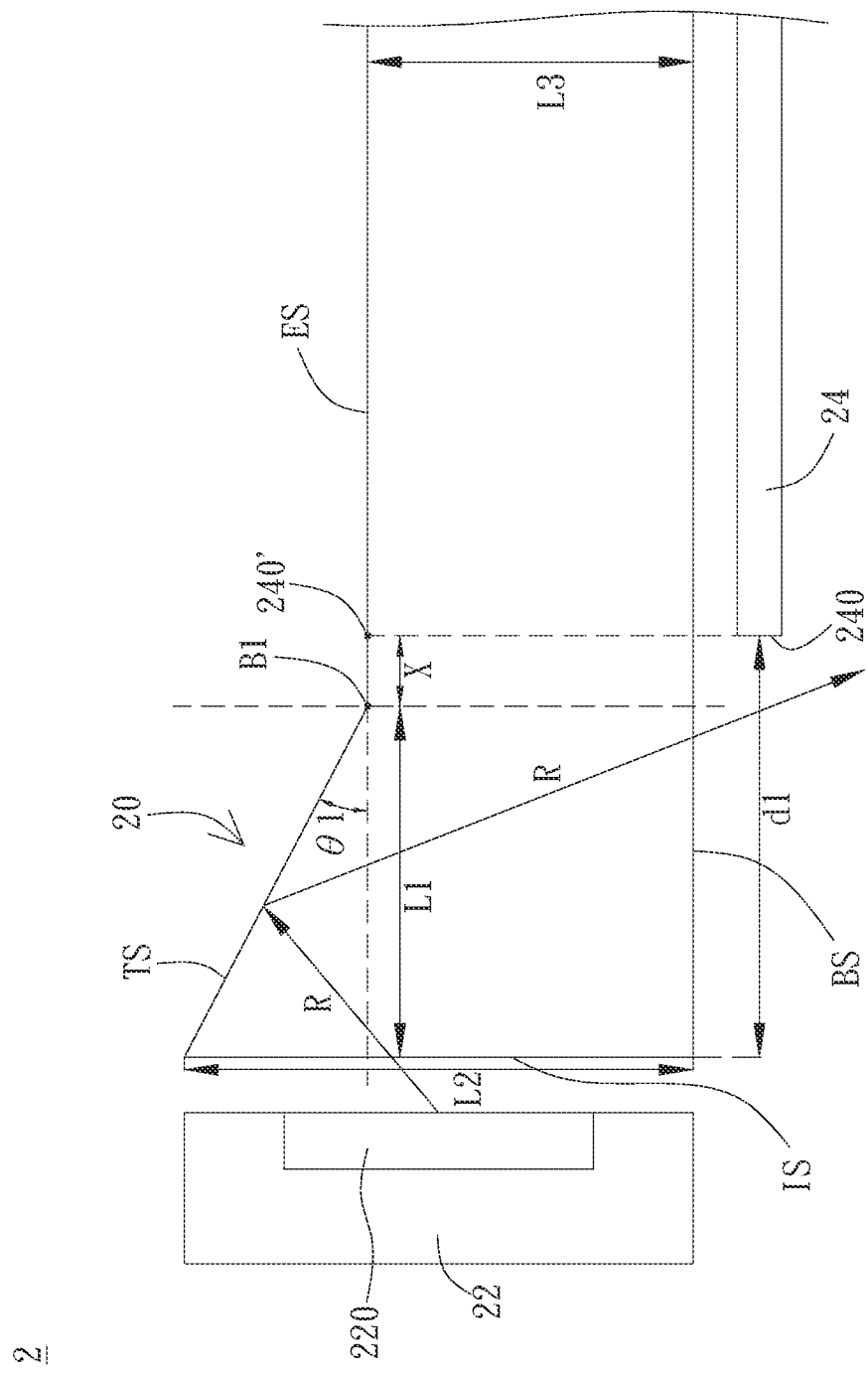
FIG. 2A illustrates a cross-sectional view of a backlight module in a preferred embodiment of the invention.
Figure 2B:
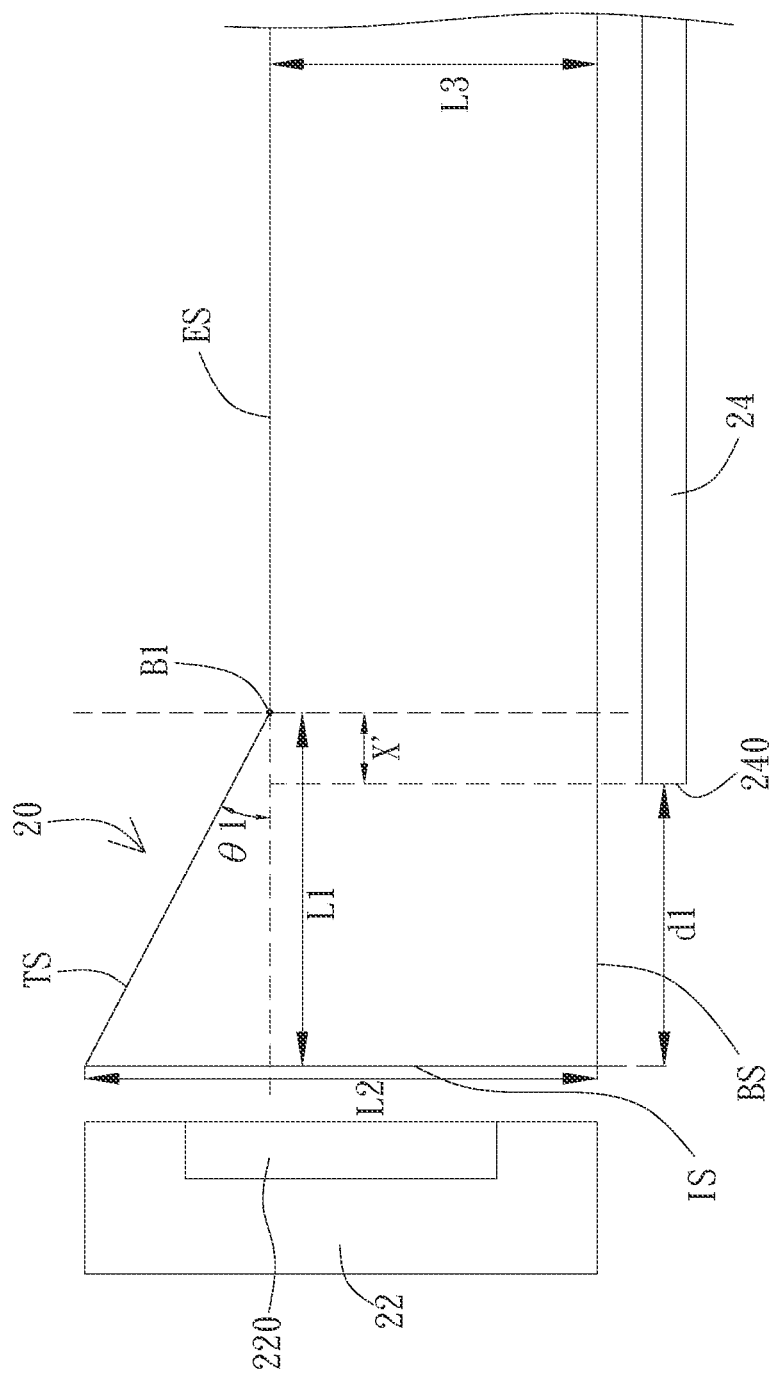
FIG. 2B illustrates a cross-sectional view of a backlight module in another embodiment of the invention.
Figure 3A:
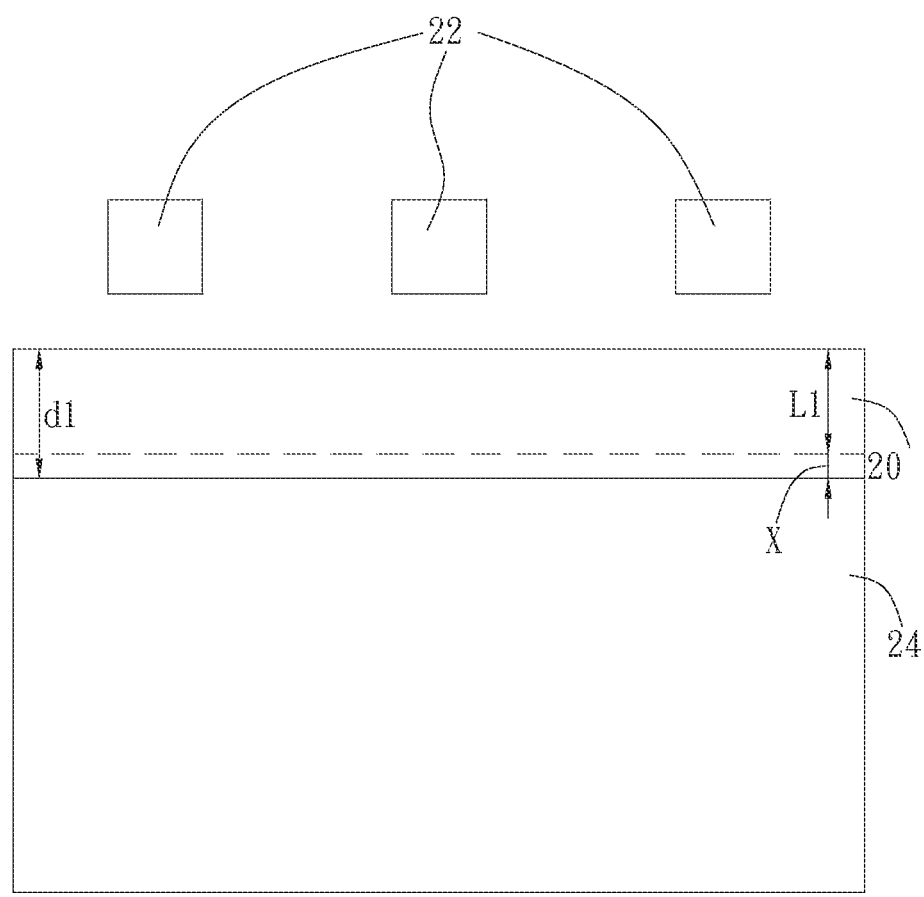
FIG. 3A illustrates a bottom view of the backlight module in FIG. 2.

Please refer to FIG. 2A and FIG. 3A. FIG. 2A illustrates a cross-sectional view of a backlight module in the embodiment, and FIG. 3A illustrates a bottom view of the backlight module in FIG. 2. As shown in FIG. 2A, the backlight module 2 includes a light guide plate 20, at least one light source 22, and a light-reflecting plate 24. Wherein, the at least one light source 22 can be LED, but not limited to this. The number of the at least one light source 22 can be one or more, such as the three light sources 22 shown in FIG. 3A, but also not limited to this. The light source 22 has a light source surface 220, and the light source surface 220 emits lights. In order to ensure that the lights emitted by the upper half of the light source surface 220 of the light source 22 can be smoothly emitted into the light guide plate 20, the light guide plate 20 used in the backlight module 2 is a wedge-shaped light guide plate. Next, the light guide plate 20, the light source 22, and the light-reflecting plate 24 of the backlight module 2 will be introduced respectively.

In this embodiment, the wedge-shaped light guide plate 20 includes a light emitting surface ES, a bottom surface BS, a light-incident surface IS, and a guiding tilt surface TS. The bottom surface BS of the wedge-shaped light guide plate 20 is opposite to the light emitting surface ES. The light-incident surface IS is disposed at a side of the light emitting surface ES and the bottom surface BS (namely the side near the light source 22) and distributed along a direction across the light emitting surface ES and the bottom surface BS (namely the light-incident surface IS is vertical to the light emitting surface ES and the bottom surface BS). One end of the guiding tilt surface TS and the light-emitting surface ES are intersected at a first boundary B1, and the other end of the guiding tilt surface TS connects with a top edge of the light-incident surface IS. The guiding tilt surface TS extends from the first boundary B1 toward a direction of protruding the light-emitting surface ES, so that the light guide plate 20 can have a wedge shape. It should be noticed that because the display region of the LCD (not shown in the figures) is located above the light-emitting surface ES, the guiding tilt surface TS of the wedge-shaped light guide plate 20 is not located in the display region of the LCD.

In this embodiment, the light source 22 is disposed corresponding to the light-incident surface IS of the wedge-shaped light guide plate 20. The light projection area formed on the plane of the light-incident surface IS by the lights emitted from the light source 22 is covered by the area of the light-incident surface IS. That is to say, light projection area formed on the plane of the light-incident surface IS by the lights emitted from the light source 22 is smaller than or equal to the area of the light-incident surface IS. By doing so, it is ensured that all lights emitted from the light source 22 can be smoothly emitted into the wedge-shaped light guide plate 20 through the light-incident surface IS of the wedge-shaped light guide plate 20, and not emitted out of the wedge-shaped light guide plate 20. It should be noticed that the configuration of the light source 22 corresponding to the light-incident surface IS of the wedge-shaped light guide plate 20 is not limited to this, and the lights emitted from the light source 22 are not necessarily emitted toward the light-incident surface IS of the wedge-shaped light guide plate 20. For example, the light source 22 can be reflected by a reflecting plane at first, and then emitted into the wedge-shaped light guide plate 20 through the light-incident surface IS of the wedge-shaped light guide plate 20, but not limited to this.

The light-reflecting plate 24 is disposed under the bottom surface BS of the wedge-shaped light guide plate 20. In practical applications, the light-reflecting plate 24 includes a light reflection material selected from the group formed by barium sulfate, titanium oxide, polyethyleneterephthalate (PET), silica, white ink, white resin, and metal, but not limited to this.

As shown in FIG. 2A, if the horizontal distance between the first boundary B1 and the light-incident surface IS of the wedge-shaped light guide plate 20 (namely the length of wedge-shaped region of the wedge-shaped light guide plate 20) is a first length L1, the light-incident surface IS has a second length L2 on a vertical cross-section, the vertical distance between the bottom surface BS and the light emitting surface ES (namely the thickness of the non-wedge region of the wedge-shaped light guide plate 20) is a third length L3, and there is a first angle θ1 between the guiding tilt surface TS and the light emitting surface ES. The light-reflecting plate 24 has an end 240 near the light-incident surface IS, and the horizontal distance between the end 240 of the light-reflecting plate 24 and the light-incident surface IS is d1. Wherein, the second length L2 is larger than the third length L3. The first angle θ1 is related to the first length L1. When the first length L1 becomes longer, the first angle θ1 will correspondingly become smaller. In addition, because the display region of the LCD (not shown in the figures) is located above the light-emitting surface ES, the wedge-shaped region of the wedge-shaped light guide plate 20 (namely the first length L1) is not located in the display region of the LCD.

Figure 3B:
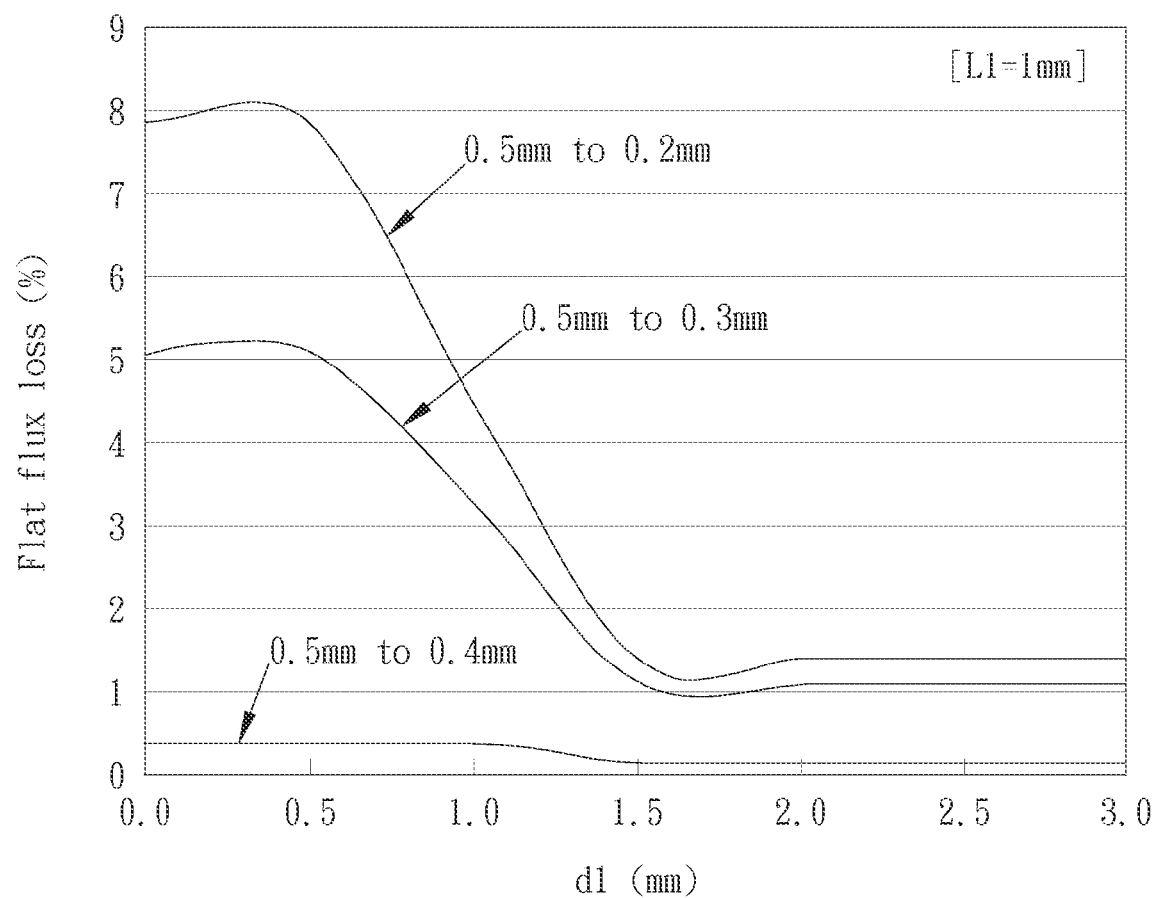
FIG. 3B and FIG. 3C illustrate hot spot simulation result diagrams when the length of the wedge-shaped region of the wedge-shaped light guide plate is 1 mm and 2 mm respectively. (the marks such as 0.5 mm to 0.4 mm and 0.5 mm to 0.2 mm shown in FIG. 3B and FIG. 3C represent the second length L2 to the third length L3)
Figure 3C:
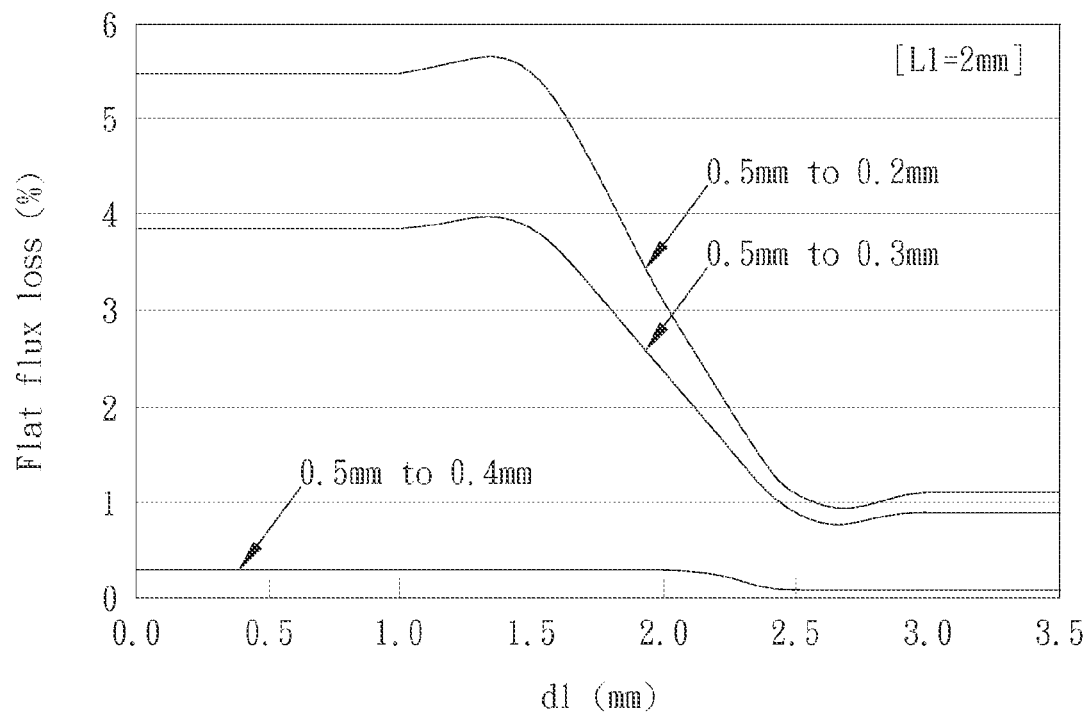

In a preferred embodiment, as shown in FIG. 2A, if the horizontal distance d1 between the end 240 of the light-reflecting plate 24 and the light-incident surface IS is larger than the first length L1, the horizontal distance between the vertical projection 240' of the end 240 on the plane of the light emitting surface ES and the first boundary B1 is the offset X. When the offset X is at least 0.5 mm, the light R reflected by the guiding tilt surface TS will not be reflected by the light-reflecting plate 24, so that the hot spot phenomenon and the light leakage phenomenon occurred in the conventional backlight module can be avoided, and the wedge-shaped light guide plate 20 can maintain good light guiding efficiency. Please refer to FIG. 3B and FIG. 3C. FIG. 3B and FIG. 3C illustrate hot spot simulation result diagrams when the length (L1) of the wedge-shaped region of the wedge-shaped light guide plate 20 is 1 mm and 2 mm respectively. It should be noticed that the marks such as 0.5 mm to 0.4 mm and 0.5 mm to 0.2 mm shown in FIG. 3B and FIG. 3C represent the second length L2 to the third length L3.

As shown in FIG. 3B and FIG. 3C, according to the experimental results, it can be known that after the factors of flat flux loss and module mechanism cooperation are considered, no matter what the length of d1 is, if the offset is 0.5 mm~1 mm, the flat flux loss caused by d1 will be smallest, therefore, the effect of avoiding the hot spot phenomenon and the light leakage phenomenon will be best. It should be noticed that the maximum 1 mm of the offset X is set based on the size range of the active area (AA) of the current backlight module. Because when the notch of the light-reflecting plate 24 is not located in the active area, the light leakage phenomenon will occur. In fact, if the active area is not necessary to be considered, when the offset is not smaller than 0.5 mm, the effect of avoiding the hot spot phenomenon and the light leakage phenomenon is good.

Figure 1:
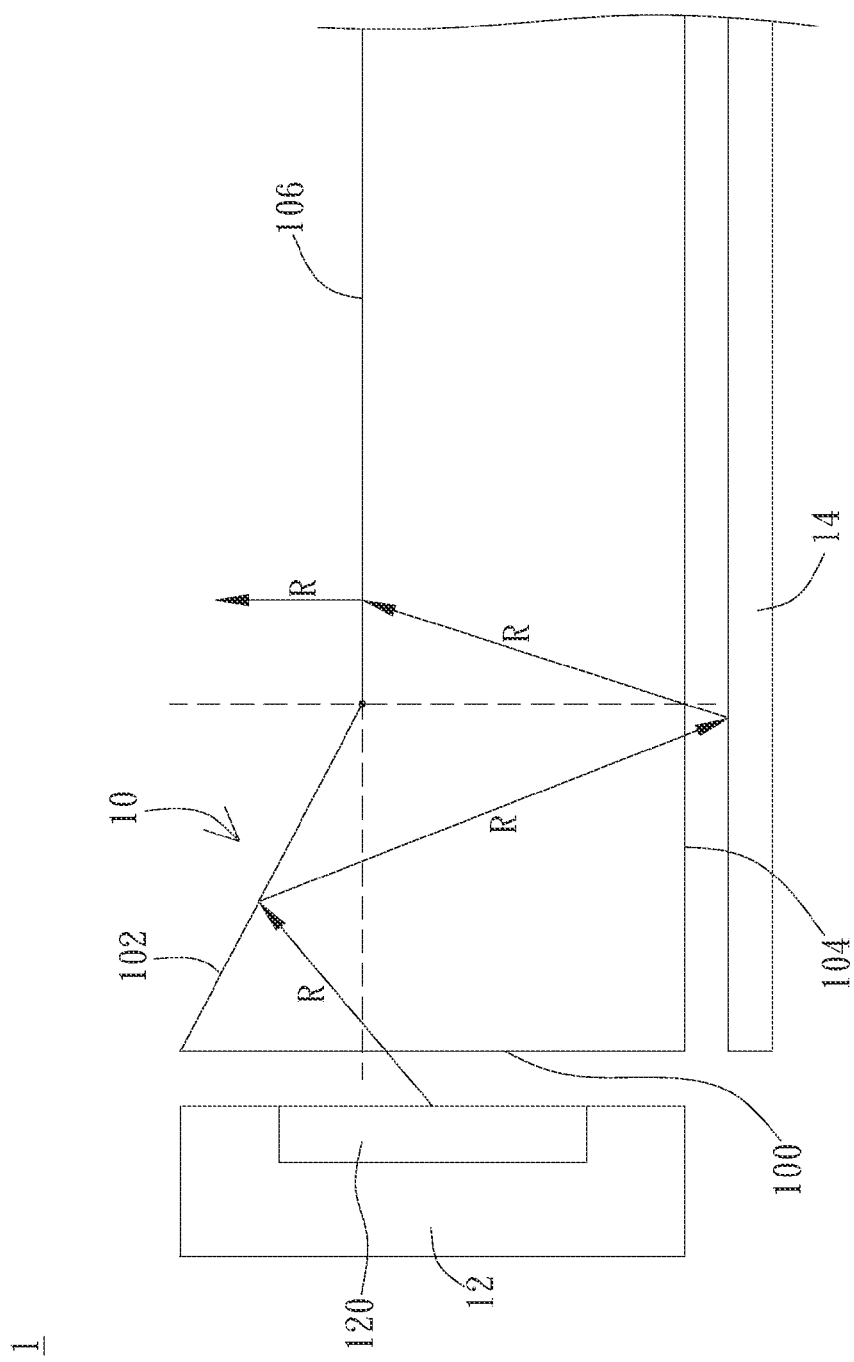
FIG. 1 illustrates a cross-sectional view of a backlight module of a conventional LCD in a prior art.

In addition, as shown in FIG. 2B, the light-reflecting plate 24 of the invention can slightly extend over the vertical projection of the first boundary B1 on the plane of the light-reflecting plate 24. At this time, the horizontal distance d1 between the end 240 of the light-reflecting plate 24 and the light-incident surface IS will be smaller than the first length L1. In an embodiment, when the horizontal distance d1 between the end 240 of the light-reflecting plate 24 and the light-incident surface IS is smaller than the first length L1, the offset X' (namely the horizontal distance between the vertical projection 240' of the end 240 on the plane of the light emitting surface ES and the first boundary B1) will not be larger than 0.5 mm. This is because when the offset X' is not larger than 0.5 mm, the flat flux loss caused by the light-reflecting plate 24 will be smaller than the flat flux loss caused by the light-reflecting plate 14 of the prior art shown in FIG. 1, that is to say, the light-reflecting plate 24 still has better effect of avoiding the hot spot phenomenon and the light leakage phenomenon than the light-reflecting plate 14 of the prior art.

In a preferred embodiment, the offset X is smaller than or equal to the first length L1. That is to say, the distance between the location of the light-reflecting plate 24 disposed under the wedge-shaped light guide plate 20 and the wedge-shaped region of the wedge-shaped light guide plate 20 cannot be too far to avoid the light-reflecting plate 24 losing its light reflecting function to cause poor efficiency of the wedge-shaped light guide plate 20. According to the experimental results, it can be known that when the first length L1 is one time to four times of the offset X, the effect of avoiding the hot spot phenomenon and the light leakage phenomenon is best and good light guiding efficiency can be maintained.

Figure 4A:
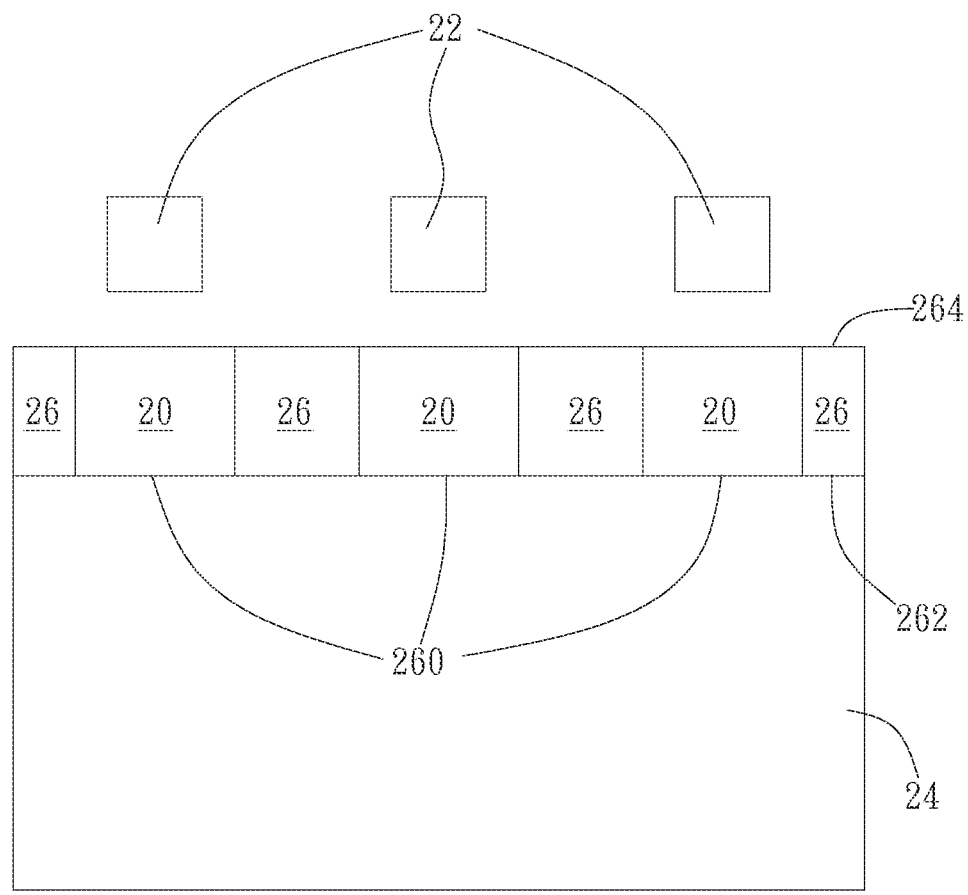
FIG. 4A through FIG. 4D illustrate bottom views of the extended light reflecting plate of the backlight module having notches of different shapes respectively.
Figure 4B:
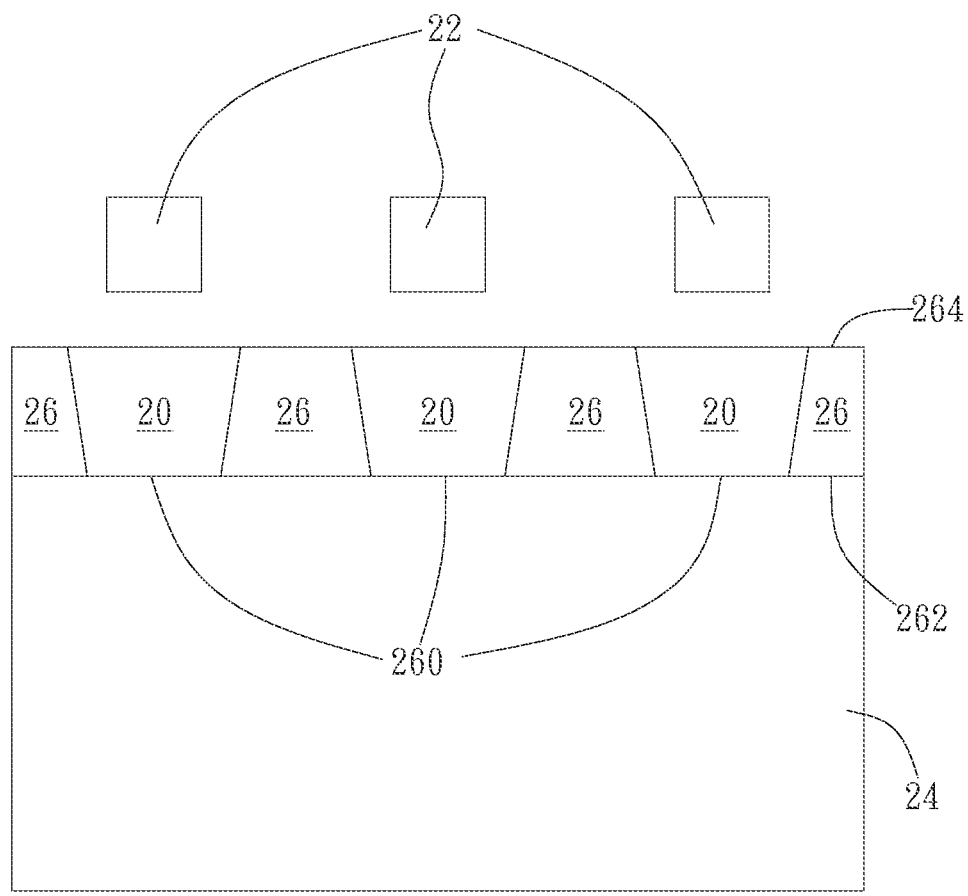
Figure 4C:
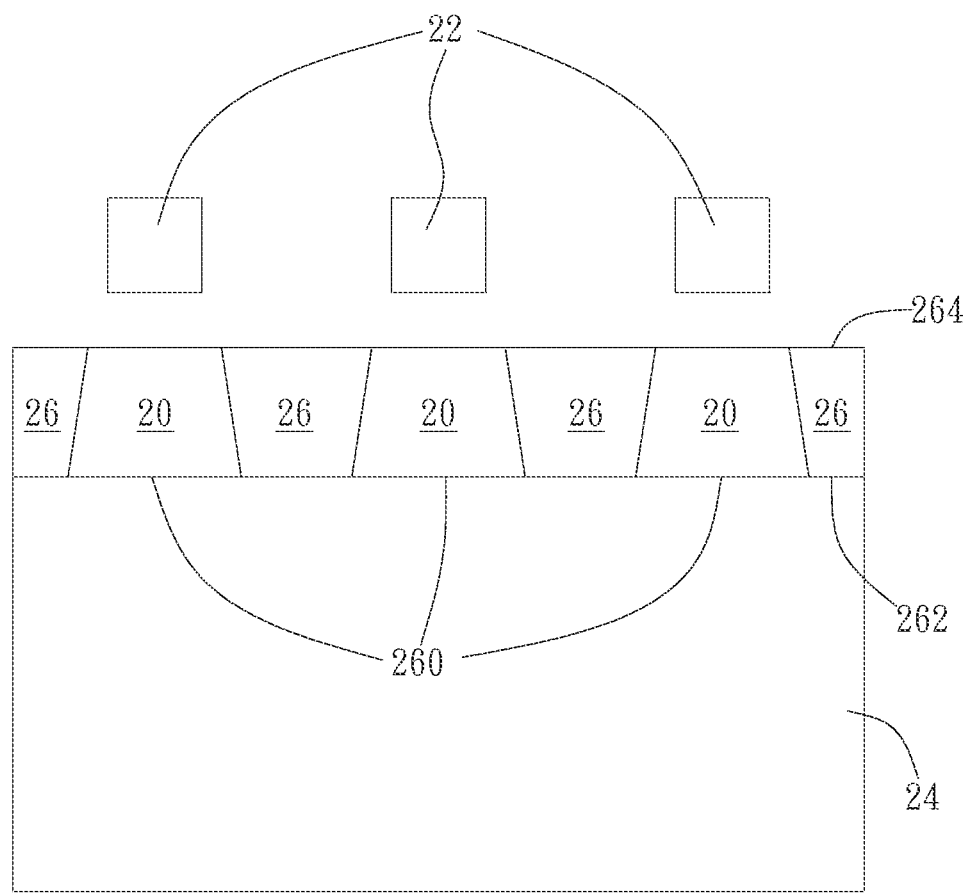
Figure 4D:
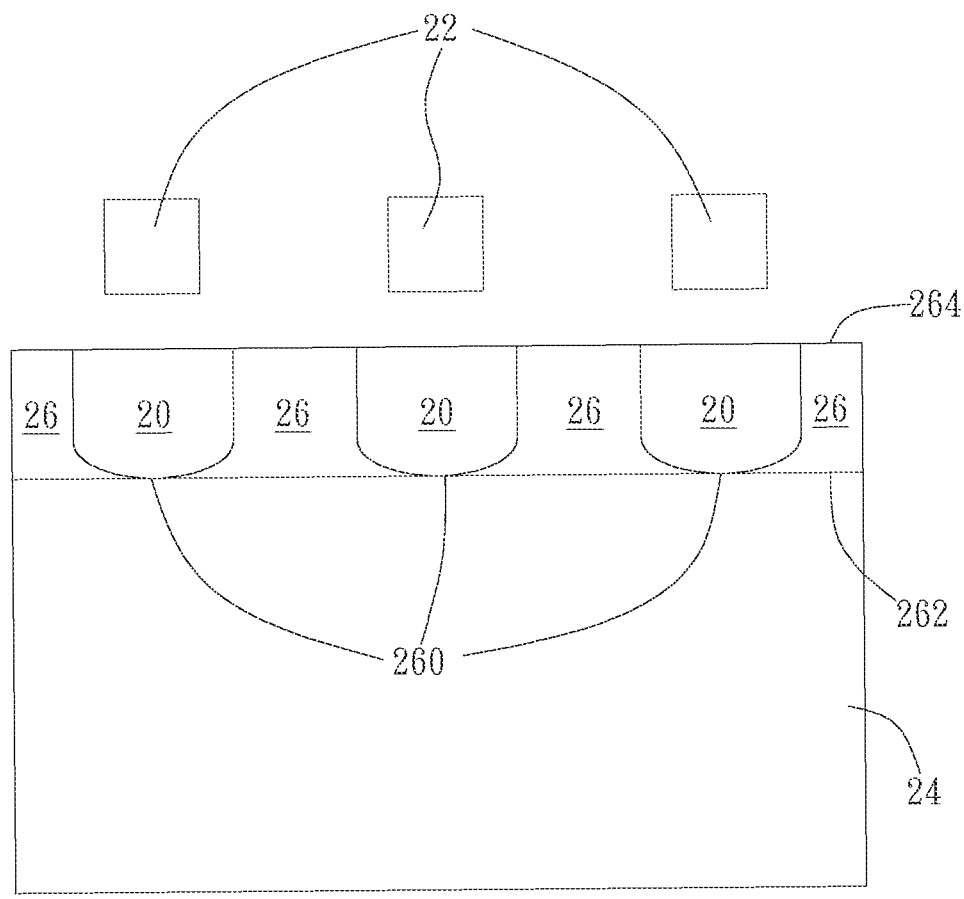

Except the bottom view of FIG. 3A, the backlight module can also include an extended light-reflecting plate 26 having notches 260 of different shapes, as shown in FIG. 4A through FIG. 4D. The wedge-shaped light guide plate 20 is exposed at the notches 260 of the extended light-reflecting plate 26. The number and the distribution of the notches 260 of the extended light-reflecting plate 26 correspond to the light sources 22. And, the shape of the notch 260 can be a square, a rectangle, a trapezoid, a triangle, an arc, a polygon, an irregular geometry, or any other shapes without any specific limitations. It should be noticed that the width of the notch 260 near the light source 22 must be larger than the width of the light source surface 220 of the light source 22 to prevent the lights emitted from the light source 22 being reflected by the extended light-reflecting plate 26. The extended light-reflecting plate 26 is disposed under the bottom surface BS of the wedge-shaped light guide plate 20. One end 262 of the extended light-reflecting plate 26 connects with the end 240 of the light-reflecting plate 24 near the light-incident surface IS, and the other end 264 of the extended light-reflecting plate 26 aligns with the plane of the light-incident surface IS. Among the different embodiments shown in FIG. 4A through FIG. 4D, the extended light-reflecting plate 26 of FIG. 4C is a preferred embodiment. This is because the shape of the notch 260 of the extended light-reflecting plate 26 in FIG. 4C is a trapezoid, and the width of the lower base (farer to the light source 22) of the trapezoid is larger than the width of the upper base (closer to the light source 22) of the trapezoid, and the type of light source 22 is matched. Therefore, the extended light-reflecting plate 26 of FIG. 4C has better effect of avoiding reflecting the lights of the light source 22 than other embodiments.

It should be noticed that in FIG. 3A, there is a horizontal distance d1 between the end 240 of the light-reflecting plate 24 and the light-incident surface IS, therefore, they are hard to be aligned and the process difficulty is higher. On the other hand, in FIG. 4A through FIG. 4D, the extended light-reflecting plate 26 and the light-reflecting plate 24 are connected or even made in one-piece, and the other end 264 of the extended light-reflecting plate 26 can be easily aligned with the light-incident surface IS. Therefore, the overall manufactory process and assembly will become easier.

Figure 5:
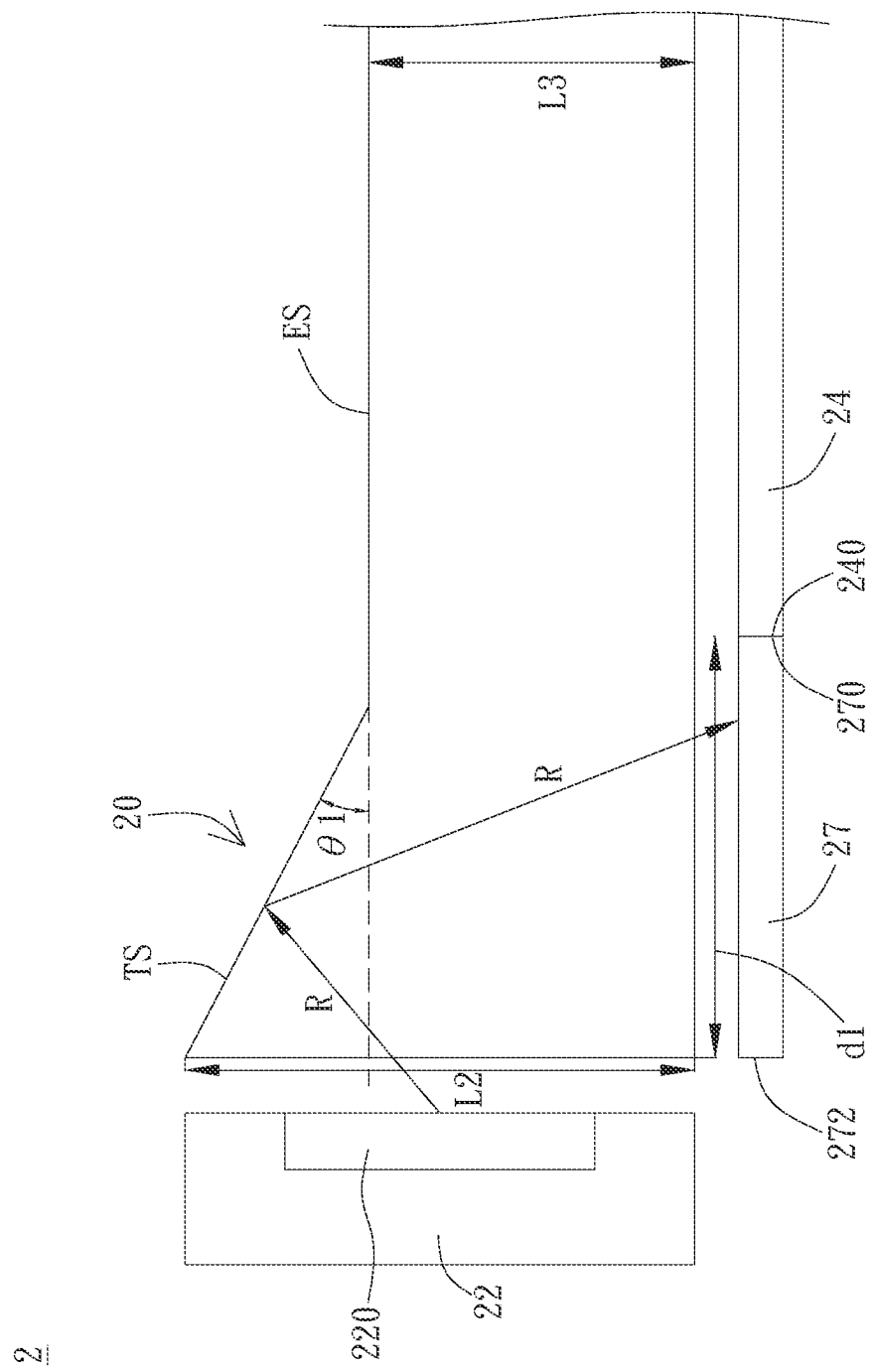
FIG. 5 through FIG. 8 illustrate cross-sectional views of backlight modules in other embodiments of the invention respectively.

Please refer to FIG. 5. In another embodiment, the backlight module can further include a light absorbing plate 27 disposed under the bottom surface BS of the wedge-shaped light guide plate 20. As shown in FIG. 5, one end 270 of the light absorbing plate 27 connects with the end 240 of the light-reflecting plate 24 near the light-incident surface IS, and the other end 272 of the light absorbing plate 27 aligns with the plane of the light-incident surface IS. That is to say, the length of the light absorbing plate 27 is d1. In fact, the light absorbing plate 27 includes light absorbing material, such as grey resin, black resin, grey oil, or black oil, but not limited to this. By doing so, the light R reflected by the guiding tilt surface TS will be absorbed by the light absorbing plate 27 instead of being reflected by the light-reflecting plate 24. Therefore, the backlight module structure shown in FIG. 5 can effectively avoid the hot spot phenomenon and the light leakage phenomenon and maintain good light guiding efficiency.

Figure 6:
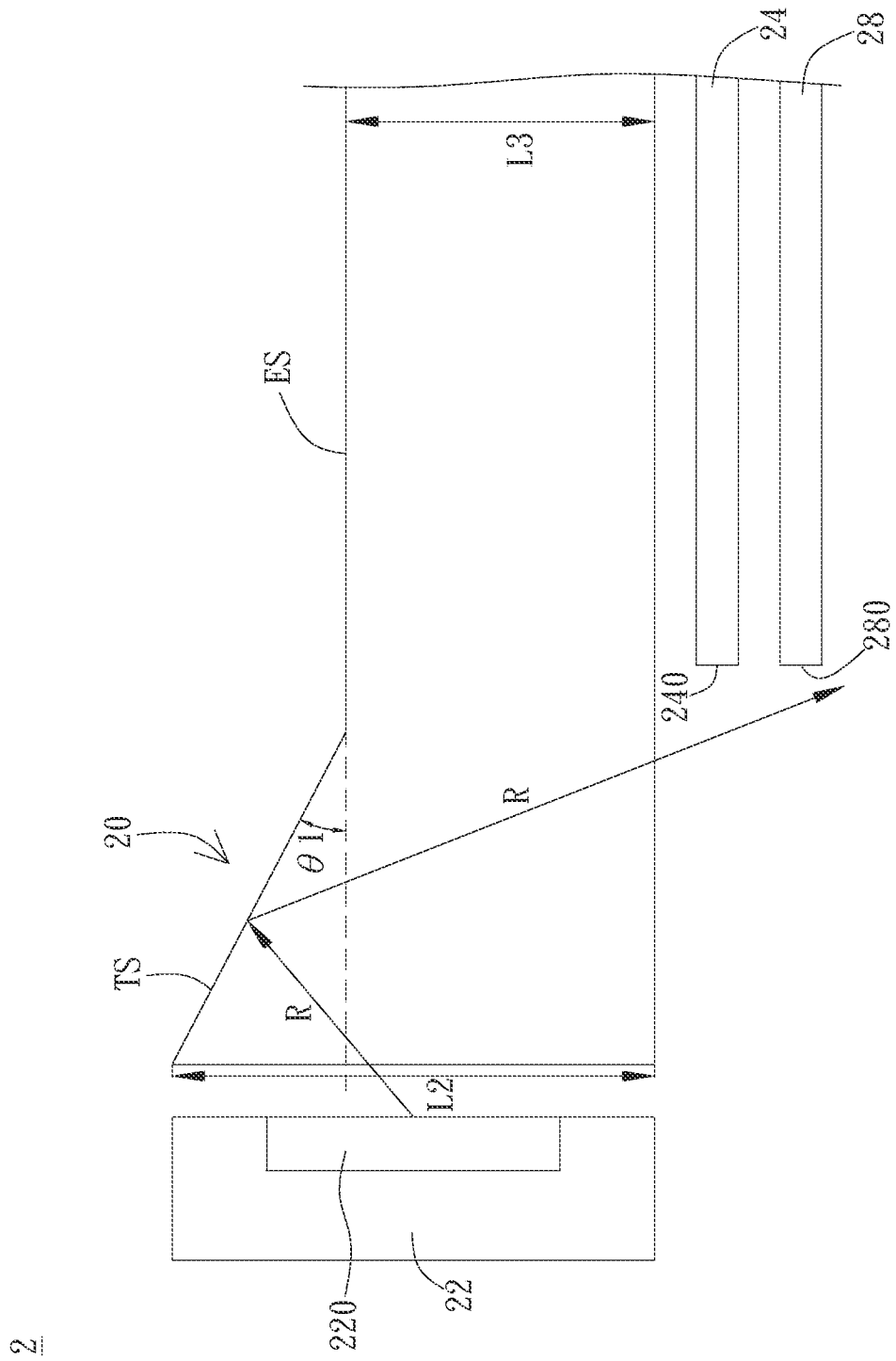

In practical applications, as shown in FIG. 6, the backlight module can further include a bezel 28 disposed under the light-reflecting plate 24. An end 280 of the bezel 28 near the light-incident surface IS aligns with the end 240 of the light-reflecting plate 24 near the light-incident surface IS to prevent the light R reflected by the guiding tilt surface TS being further reflected by the light-reflecting plate 24 or the bezel 28, therefore, the hot spot phenomenon and the light leakage phenomenon can be avoided.

Figure 7:
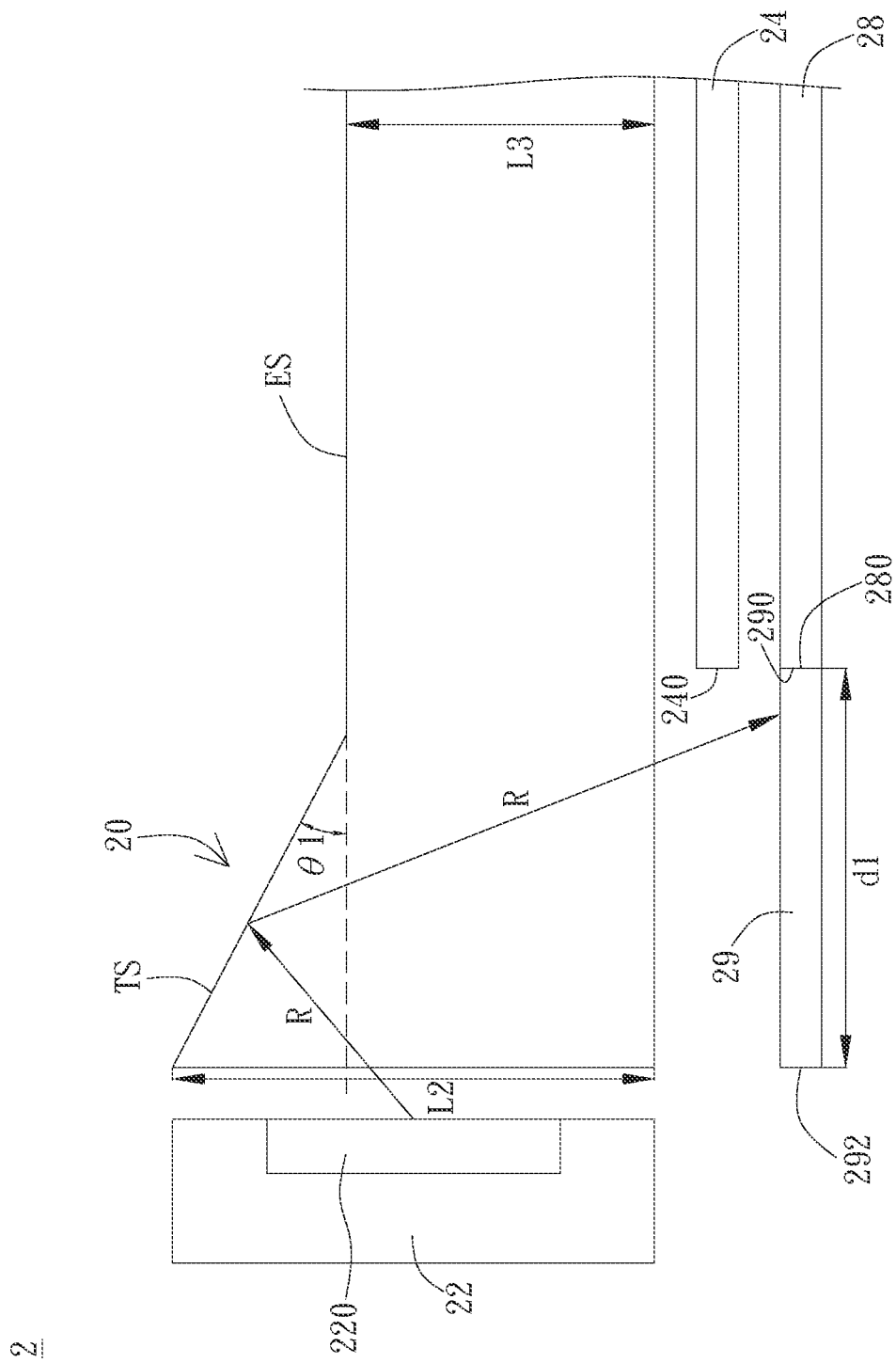

Please refer to FIG. 7. In another embodiment, the backlight module can further include a light absorbing plate 29 connecting with the bezel 28. One end 290 of the light absorbing plate 29 connects with the end 280 of the bezel 28 near the light-incident surface IS, and the other end 292 of the light absorbing plate 29 aligns with the plane of the light-incident surface IS. That is to say, the length of the light absorbing plate 29 is d1. In fact, the light absorbing plate 29 includes light absorbing material, such as grey resin, black resin, grey oil, or black oil, but not limited to this. By doing so, the light R reflected by the guiding tilt surface TS will be absorbed by the light absorbing plate 29 instead of being reflected by the light-reflecting plate 24 or the bezel 28. Therefore, the backlight module structure shown in FIG. 7 can effectively avoid the hot spot phenomenon and the light leakage phenomenon and maintain good light guiding efficiency.

Figure 8:
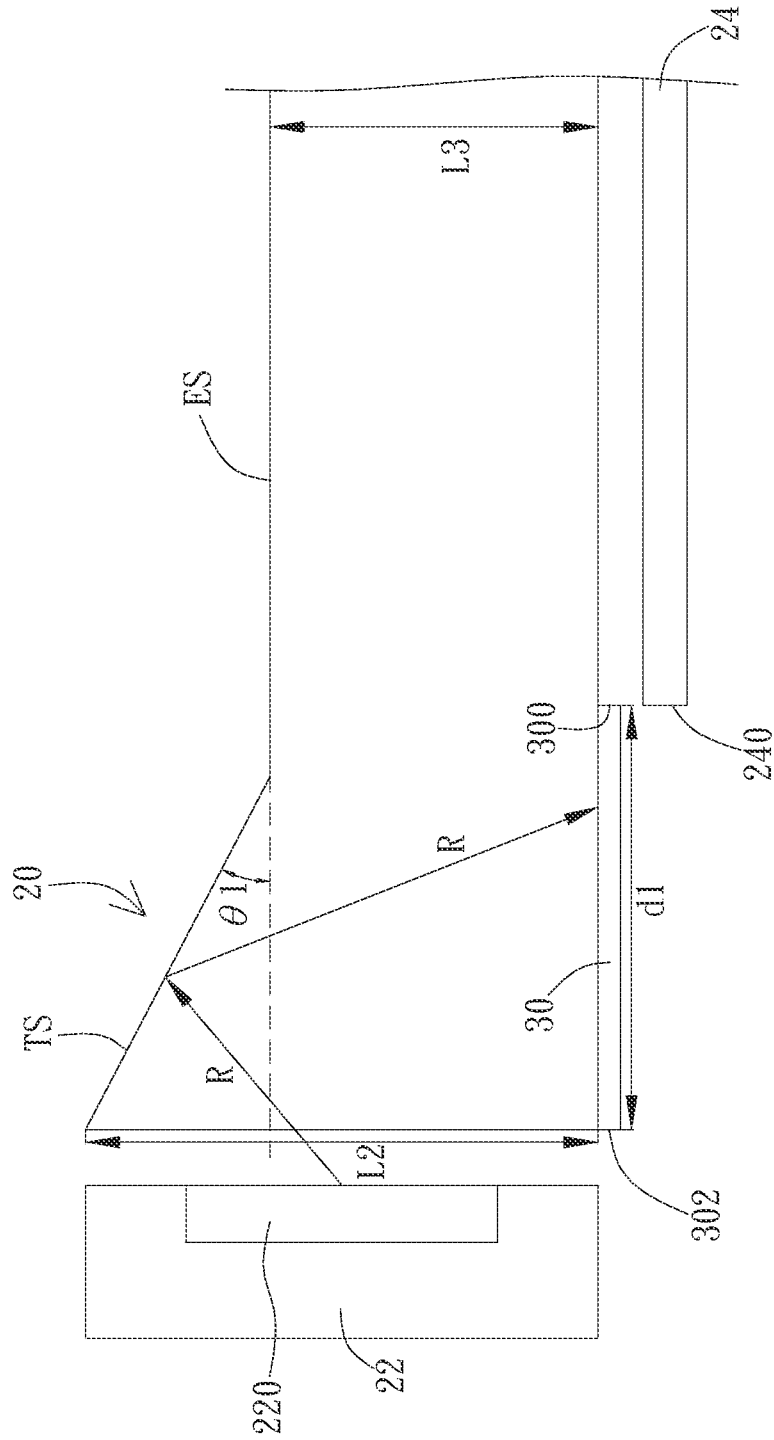

Please refer to FIG. 8. In another embodiment, the backlight module can further include a light absorbing layer 30 formed on the bottom surface BS of the wedge-shaped light guide plate 20. One end 300 of the light absorbing layer 30 aligns with the vertical projection 240' of the end 240 of the light-reflecting plate 24 on the bottom surface BS, and the other end 302 of the light absorbing layer 30 aligns with the plane of the light-incident surface IS. That is to say, the length of the light absorbing layer 30 is d1. In fact, the light absorbing layer 30 includes light absorbing material, such as grey resin, black resin, grey oil, or black oil, but not limited to this. By doing so, the light R reflected by the guiding tilt surface TS will be absorbed by the light absorbing layer 30 instead of being reflected. Therefore, the backlight module structure shown in FIG. 8 can effectively avoid the hot spot phenomenon and the light leakage phenomenon and maintain good light guiding efficiency.

Figure 9:
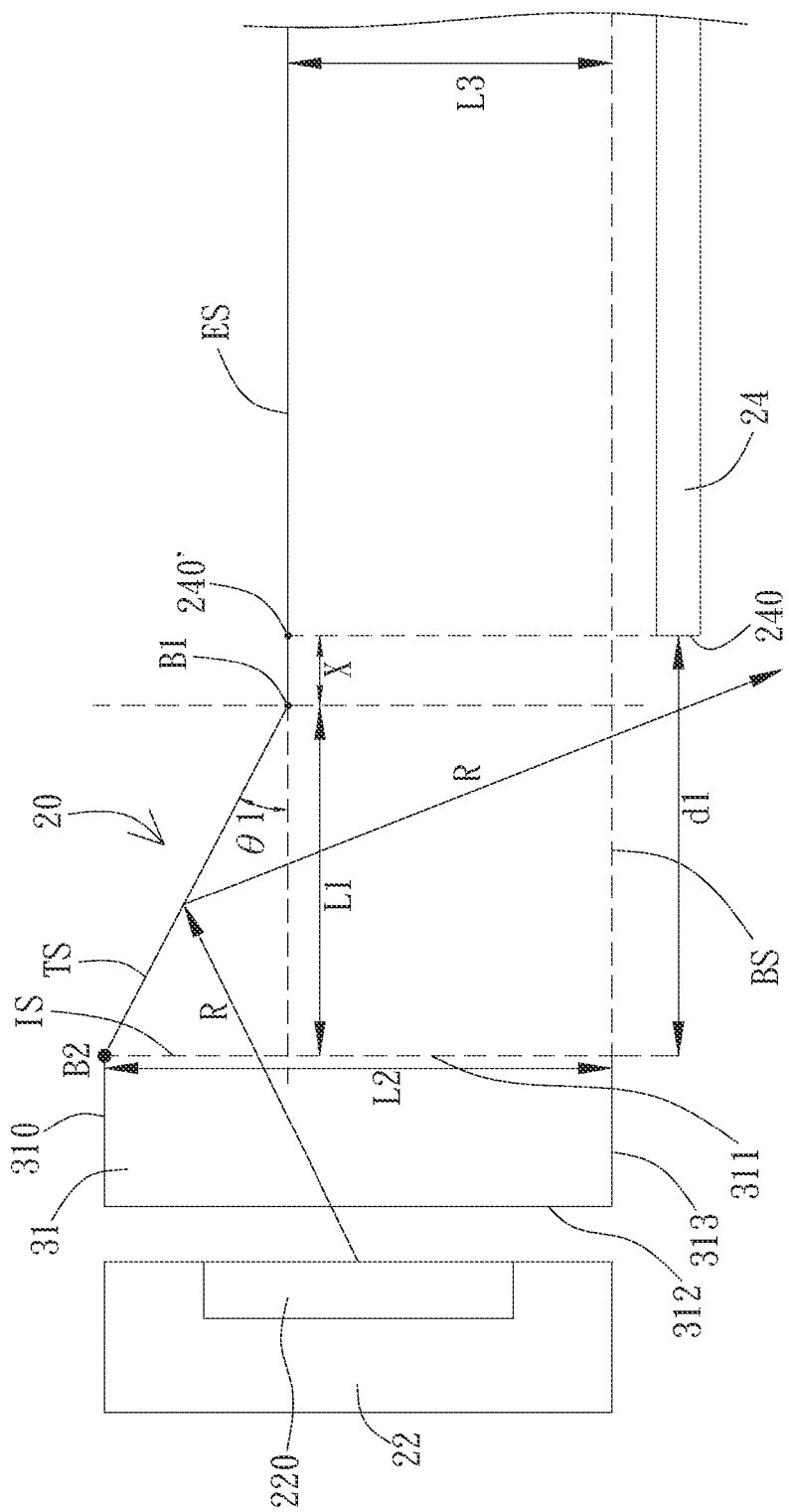
FIG. 9 illustrates a cross-sectional view of the light guide plate of the backlight module in FIG. 2 further including an optical coupling element.

It should be noticed that the light guide plate of the backlight module in the invention is not limited to the wedge-shaped light guide plate shown in FIG. 2A. Please refer to FIG. 9. FIG. 9 illustrates a cross-sectional view of the light guide plate of the backlight module in FIG. 2 further including an optical coupling element. As shown in FIG. 9, the light guide plate 20 further includes an optical coupling element 31. Wherein, a side surface 311 of the optical coupling element 31 connects with the light-incident surface IS; another side surface 312 of the optical coupling element 31 is disposed corresponding to the light source 33 and distributed along a direction across the light emitting surface ES and the bottom surface BS; a top surface 310 of the optical coupling element 31 is a flat surface and connects with the other end of the guiding tilt surface TS at the top edge B2 of the light-incident surface IS; a bottom surface 313 of the optical coupling element 31 aligns with the bottom surface BS.

Compared to the prior art, the backlight module applied in the LCD of the invention has various kinds of design of light-reflecting plate structure and other elements. It can not only effectively improve the hot spot phenomenon and the light leakage phenomenon occurred in the conventional backlight module using wedge-shaped light guide plate, but also maintain good light guiding efficiency to obviously enhance the display effect of the LCD.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A backlight module, comprising:
  a light guide plate, comprising:
    a light emitting surface;
    a bottom surface opposite to the light emitting surface;
    a light-incident surface, disposed at a side of the light emitting surface and the bottom surface and distributed along a direction across the light emitting surface and the bottom surface; and
    a guiding tilt surface, one end of the guiding tilt surface and the light-emitting surface being intersected at a first boundary, and the other end of the guiding tilt surface connecting with a top edge of the light-incident surface, the guiding tilt surface extending toward a direction of protruding the light-emitting surface, and a horizontal distance between the first boundary and the light-incident surface being a first length;
  at least one light source, disposed corresponding to the light incident end, the light source having a light source surface, and a projection surface of the light source surface on the plane of the light-incident surface being covered by the light-incident surface; and
  a light-reflecting plate, disposed under the bottom surface of the light guide plate, and the light-reflecting plate having an end near the light-incident surface;
  wherein when the horizontal distance between the end of the light-reflecting plate and the light-incident surface is smaller than the first length, the horizontal distance between a vertical projection of the end of the light-reflecting plate on the plane of the light emitting surface and the first boundary is a first offset, when the horizontal distance between the end of the light-reflecting plate and the light-incident surface is larger than the first length, the horizontal distance between the vertical projection of the end of the light-reflecting plate on the plane of the light emitting surface and the first boundary is a second offset, the first offset is not larger than 0.5 mm, and the second offset is at least 0.5 mm, when the horizontal distance between the end of the light-reflecting plate and the light-incident surface is the same as the first length, the horizontal distance between the vertical projection of the end of the light-reflecting plate on the plane of the light emitting surface and the first boundary is zero.

2. The backlight module of claim 1, wherein the second offset is not larger than 1 mm.

3. The backlight module of claim 1, wherein the first offset is smaller than or equal to the first length.

4. The backlight module of claim 1, wherein the second offset is smaller than or equal to the first length.

5. The backlight module of claim 1, wherein the light-incident surface has a second length on a vertical cross-section and the vertical distance between the bottom surface and the light emitting surface is a third length, the second length is larger than the third length.

6. The backlight module of claim 1, further comprising:
an extended light-reflecting plate, disposed under the bottom surface of the light guide plate, one end of the extended light-reflecting plate connecting with the end of the light-reflecting plate, and the other end of the extended light-reflecting plate aligning with the plane of the light-incident surface.

7. The backlight module of claim 6, wherein the extended light-reflecting plate has a notch, and the number and the distribution of the notch correspond to the light source.

8. The backlight module of claim 7, wherein the shape of the notch is one selected from the group formed by a square, a rectangle, a trapezoid, a triangle, an arc, a polygon, and an irregular geometry.

9. The backlight module of claim 1, further comprising:
a light absorbing plate, disposed under the bottom surface of the light guide plate, one end of the light absorbing plate connecting with the end of the light-reflecting plate, and the other end of the light absorbing plate aligning with the plane of the light-incident surface.

10. The backlight module of claim 1, further comprising:
a bezel, disposed under the light-reflecting plate, an end of the bezel near the light-incident surface aligning with the end of the light-reflecting plate.

11. The backlight module of claim 10, further comprising:
a light absorbing plate, one end of the light absorbing plate connecting with the end of the bezel, and the other end of the light absorbing plate aligning with the plane of the light-incident surface.

12. The backlight module of claim 1, wherein a light absorbing layer is formed on the bottom surface of the light guide plate, and one end of the light absorbing layer aligns with the vertical projection of the end of the light-reflecting plate on the bottom surface, and the other end of the light absorbing layer aligns with the plane of the light-incident surface.

13. The backlight module of claim 1, wherein the light guide plate further comprises an optical coupling element, a side surface of the optical coupling element connects with the light-incident surface, another side surface of the optical coupling element is disposed corresponding to the light source and distributed along a direction across the light emitting surface and the bottom surface, a top surface of the optical coupling element is a flat surface and connects with the other end of the guiding tilt surface at the top edge of the light-incident surface.

14. A backlight module, comprising:
a light guide plate, comprising:
a light emitting surface;
a bottom surface, opposite to the light emitting surface;
a light-incident surface, disposed at a side of the light emitting surface and the bottom surface and distributed along a direction across bottom surface; and
a guiding tilt surface, one end of the guiding tilt surface and the light emitting surface being intersected at a first boundary, the other end of the guiding tilt surface connecting with the top edge of the light-incident surface, the guiding tilt surface extending from the first boundary toward a direction protruding the light emitting surface, and the horizontal distance between the first boundary and the light incident surface is a first length;
at least one light source, disposed corresponding to the light-incident surface, the light source having a light source surface, the vertical projection of the light source surface on the plane of the light-incident surface being covered by the light-incident surface; and
a light-reflecting plate, disposed under the bottom surface of the light guide plate, and the light-reflecting plate having an end near the light-incident surface; and
an extended light-reflecting plate, disposed under the bottom surface of the light guide plate, one end of the extended light-reflecting plate connecting with the end of the light-reflecting plate, and the other end of the extended light-reflecting plate aligning with the plane of the light-incident surface;
wherein the horizontal distance between the vertical projection of the end of the light-reflecting plate on the plane of the light emitting surface and the first boundary is smaller than or equal to the first length.

15. The backlight module of claim 14, wherein the first length is one time to four times of the horizontal distance between the vertical projection of the end of the light-reflecting plate on the plane of the light emitting surface and the light incident surface.

16. The backlight module of claim 14, wherein the first length is smaller than the horizontal distance between the end of the light-reflecting plate and the light-incident surface.

17. The backlight module of claim 14, wherein the light-incident surface has a second length on a vertical cross-section and the vertical distance between the bottom surface and the light emitting surface is a third length, the second length is larger than the third length.

18. The backlight module of claim 14, wherein the extended light-reflecting plate has at least one notch, and the number and the distribution of the at least one notch correspond to the at least one light source.

19. The backlight module of claim 18, wherein the shape of the at least one notch is one selected from the group formed by a square, a rectangle, a trapezoid, a triangle, an arc, a polygon, and an irregular geometry.

20. The backlight module of claim 14, further comprising:
a light absorbing plate, disposed under the bottom surface of the light guide plate, one end of the light absorbing plate connecting with the end of the light-reflecting plate, and the other end of the light absorbing plate aligning with the plane of the light-incident surface.

21. The backlight module of claim 14, further comprising:
a bezel, disposed under the light-reflecting plate, an end of the bezel near the light-incident surface aligning with the end of the light-reflecting plate.

22. The backlight module of claim 21, further comprising:
a light absorbing plate, one end of the light absorbing plate connecting with the end of the bezel, and the other end of the light absorbing plate aligning with the plane of the light-incident surface.

23. The backlight module of claim 14, wherein a light absorbing layer is formed on the bottom surface of the light guide plate, and an end of the light absorbing layer aligns with the vertical projection of the end of the light-reflecting plate on the bottom surface, and the other end of the light absorbing layer aligns with the plane of the light-incident surface.

24. The backlight module of claim 14, wherein the light guide plate further comprises an optical coupling element, a side surface of the optical coupling element connects with the light-incident surface, another side surface of the optical coupling element is disposed corresponding to the light source and distributed along a direction across the light emitting surface and the bottom surface, a top surface of the optical coupling element is a flat surface and connects with the other end of the guiding tilt surface at the top edge of the light-incident surface.

* * * * *